United States Patent
Nagami

(10) Patent No.: US 8,982,379 B2
(45) Date of Patent: Mar. 17, 2015

(54) IMAGE PROCESSING APPARATUS HAVING CONTROLLER FOR CONTROLLING POWER SUPPLY AFTER INTERRUPTION

(71) Applicant: Masahiro Nagami, Anjo (JP)

(72) Inventor: Masahiro Nagami, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/953,067

(22) Filed: Jul. 29, 2013

(65) Prior Publication Data
US 2014/0029043 A1  Jan. 30, 2014

(30) Foreign Application Priority Data

Jul. 30, 2012  (JP) .................................. 2012-168592

(51) Int. Cl.
- *G06K 15/00* (2006.01)
- *H04N 1/00* (2006.01)
- *G03G 15/00* (2006.01)

(52) U.S. Cl.
CPC ....... *H04N 1/00904* (2013.01); *H04N 1/00899* (2013.01); *H04N 1/00888* (2013.01); *H04N 1/00896* (2013.01); *G03G 15/5004* (2013.01); *G03G 15/55* (2013.01); *H04N 2201/0094* (2013.01)
USPC ...................................................... 358/1.14

(58) Field of Classification Search
None
See application file for complete search history.

(56) References Cited

U.S. PATENT DOCUMENTS

| | | | | |
|---|---|---|---|---|
| 2003/0197886 | A1* | 10/2003 | Fujinaga et al. | 358/1.14 |
| 2005/0031368 | A1* | 2/2005 | Han et al. | 399/88 |
| 2005/0286925 | A1* | 12/2005 | Yoshida | 399/88 |
| 2007/0189796 | A1* | 8/2007 | Chae et al. | 399/69 |
| 2008/0124094 | A1* | 5/2008 | Eom | 399/9 |
| 2009/0267415 | A1* | 10/2009 | Suekane et al. | 307/39 |
| 2011/0235083 | A1* | 9/2011 | Suzuki | 358/1.14 |

FOREIGN PATENT DOCUMENTS

| | | |
|---|---|---|
| JP | 2004-133259 A | 4/2004 |
| JP | 2005-025515 A | 1/2005 |
| JP | 2009-251275 A | 10/2009 |

\* cited by examiner

*Primary Examiner* — Jeremiah Bryar
(74) *Attorney, Agent, or Firm* — Banner & Witcoff, Ltd.

(57) ABSTRACT

An image processing apparatus includes an input/output unit which performs an input operation and/or an output operation, a supply unit which supplies power from a primary power source to the input/output unit, a storage unit which stores therein a state of power supply to the input/output unit before the power supply from the primary power source is interrupted, and a controller which, when the power supply is started from a state where the power supply from the primary power source is interrupted, determines whether to supply power to the input/output unit based on the state of power supply stored in the storage unit, and when determined to supply power to the input/output unit, controls the supply unit to supply or not to supply power to the input/output unit based on the determination.

10 Claims, 7 Drawing Sheets

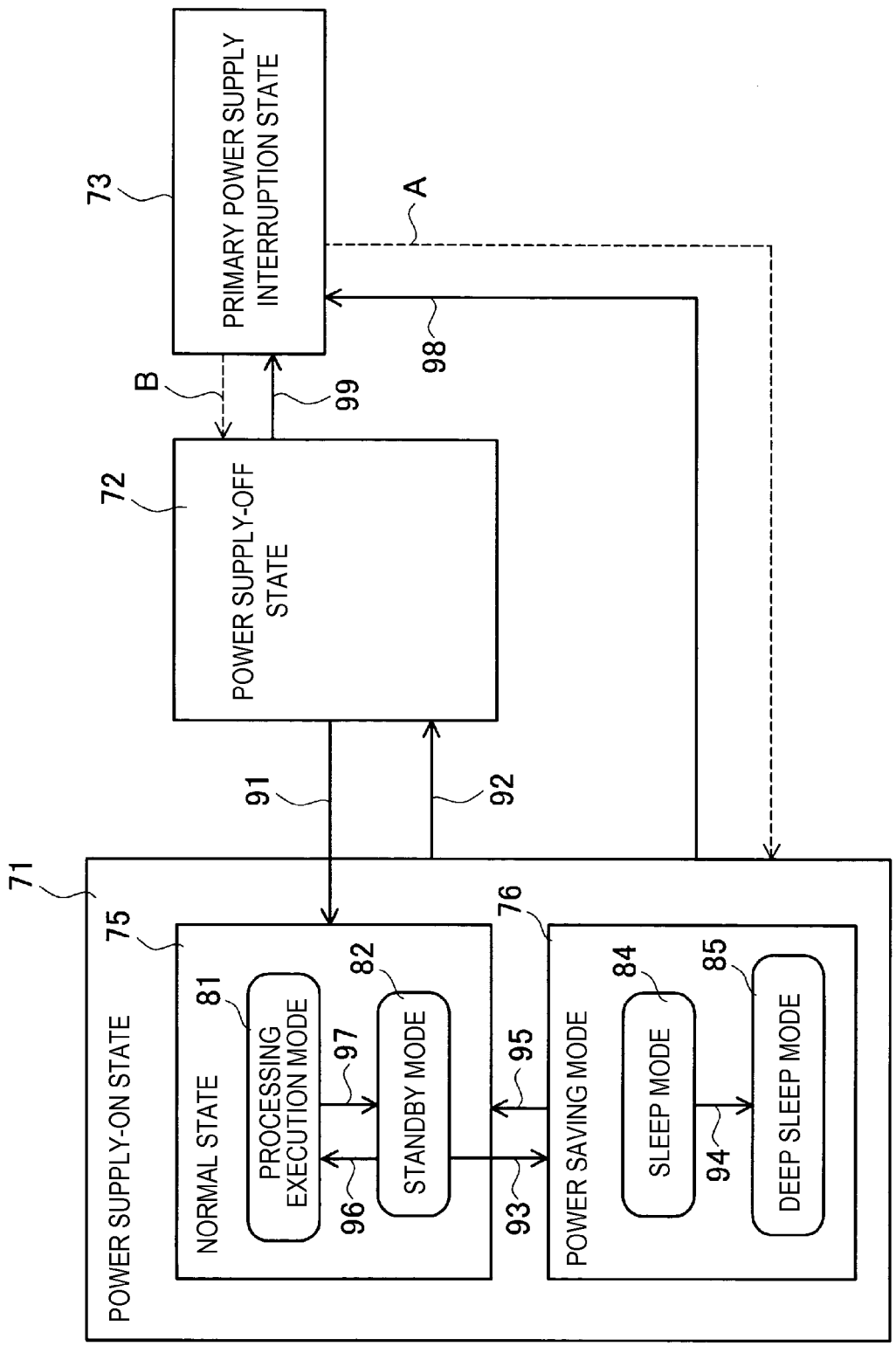

FIG. 4

| CONNECTION STATUS | POWER SUPPLY | | | CHANGEOVER SWITCH OF LOW-VOLTAGE POWER SUPPLY UNIT | | | | |
|---|---|---|---|---|---|---|---|---|
| POWER SUPPLY STATE | POWER SUPPLY SWITCH OF LOW-VOLTAGE POWER SUPPLY UNIT | MAIN SUBSTRATE | | 53 | 54 | 55 | 56 | 57 |
| PRIMARY POWER SUPPLY INTERRUPTION STATE | × | × | | | | | | |
| POWER SUPPLY-OFF STATE | ○ | × | | × | × | × | × | × |
| POWER SUPPLY -ON STATE | PROCESSING EXECUTION MODE | ○ | ○ | ○ | ○ | ○ | ○ | ○ |
| | STANDBY MODE | ○ | ○ | ○ | ○ | ○ | ○ | ○ |
| | SLEEP MODE | ○ | ○ | ○ | ○ | × | ○ | ○ |
| | DEEP SLEEP MODE | ○ | ○ | ○ | ○ | × | × | × |

IMAGE PROCESSING APPARATUS HAVING CONTROLLER FOR CONTROLLING POWER SUPPLY AFTER INTERRUPTION

CROSS-REFERENCE TO RELATED APPLICATION

This application claims priority from Japanese Patent Application No. 2012-168592, filed on Jul. 30, 2012, the entire subject matter of which is incorporated herein by reference.

TECHNICAL FIELD

Aspects of the present invention relate to an image processing apparatus.

BACKGROUND

There has been known an image processing apparatus having a plurality of states of power supply which are different in a combination of power supply destinations, and configured to control power supply to respective constitutional elements. For example, there has been known an image processing apparatus which has a power supply-on state and a power supply-off state and which can be switched from the power supply-on state to the power supply-off state on a condition that a power supply-off command is received or non-operating state continues for a predetermined time or longer. The power supply-on state refers to a state where power is supplied to constitutional elements of the apparatus, and the power supply-off state refers to a state where power is supplied to only a constitutional element for receiving a power supply-on command and is not supplied to the other constitutional elements.

For example, JP-A-2009-251275 describes a technique of controlling the power supply. An image forming apparatus described in JP-A-2009-251275 stores a signal from a power supply switch in a non-volatile memory before power supply is interrupted. Then, when the power supply is resumed, the image forming apparatus controls, based on information stored in the non-volatile memory, a return operation in respective cases including a case where normal shutdown processing such as operation of the power supply switch is performed and the power supply is then interrupted, and a case where the power supply is interrupted without performing the normal shutdown processing due to power failure.

SUMMARY

However, according to the above-described technique, a following problem might occur. That is, when the power supply from a commercial power source is interrupted due to power failure, the image forming apparatus is returned to the power supply-on state upon recovery from the power supply interruption, irrespective of whether a state before the power supply is interrupted is the power supply-on state or the power supply-off state. Therefore, when the power supply is interrupted at the power supply-off state, the image forming apparatus cannot reproduce the state of power supply before the interruption of the power supply.

Accordingly, an aspect of the present invention provides an image processing apparatus capable of reproducing a state of power supply before interruption of power supply, when resuming the power supply.

According to an illustrative embodiment of the present invention, there is provided an image processing apparatus including an input/output unit, a supply unit, a storage unit, and a controller. The input/output unit is configured to perform at least one of an input operation and an output operation which are related to image processing. The supply unit is configured to supply power from a primary power source to the input/output unit through a supply circuit for supplying power. The storage unit is configured to store therein a state of power supply to the input/output unit before the power supply from the primary power source is interrupted. The controller is configured to: when the power supply is started from a state where the power supply from the primary power source is interrupted, determine whether to supply power to the input/output unit through the supply circuit, based on the state of power supply stored in the storage unit; when it is determined to supply power to the input/output unit, control the supply unit to supply power to the input/output unit; and when it is determined not to supply power to the input/output unit, control the supply unit not to supply power to the input/output unit.

According to the above configuration, the image processing apparatus stores, in the storage unit, the state of power supply before the power supply from the primary power source is interrupted. When the power supply from the primary power source starts at the state (power supply interruption state) where the power supply from the primary power source is interrupted, the image processing apparatus determines the power supply destination in accordance with the stored state of power supply. That is, the image processing apparatus does not always enter the power supply-on state after the primary power source is recovered. Therefore, it is possible to reproduce the state of power supply before the interruption of the power supply.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 3 is an explanatory view showing a relation among states of power supply and operation modes;

FIG. 4 is an explanatory view showing power supply destinations and switch states in respective states of power supply and operation modes;

DETAILED DESCRIPTION

Hereinafter, illustrative embodiments of the present invention will be specifically described with reference to the accompanying drawings. In an illustrative embodiment, an inventive concept of the present invention is applied to a Multi-Function Peripheral (MFP) having an image reading function and an image forming function.

[Configuration of MFP]

Figure 1:
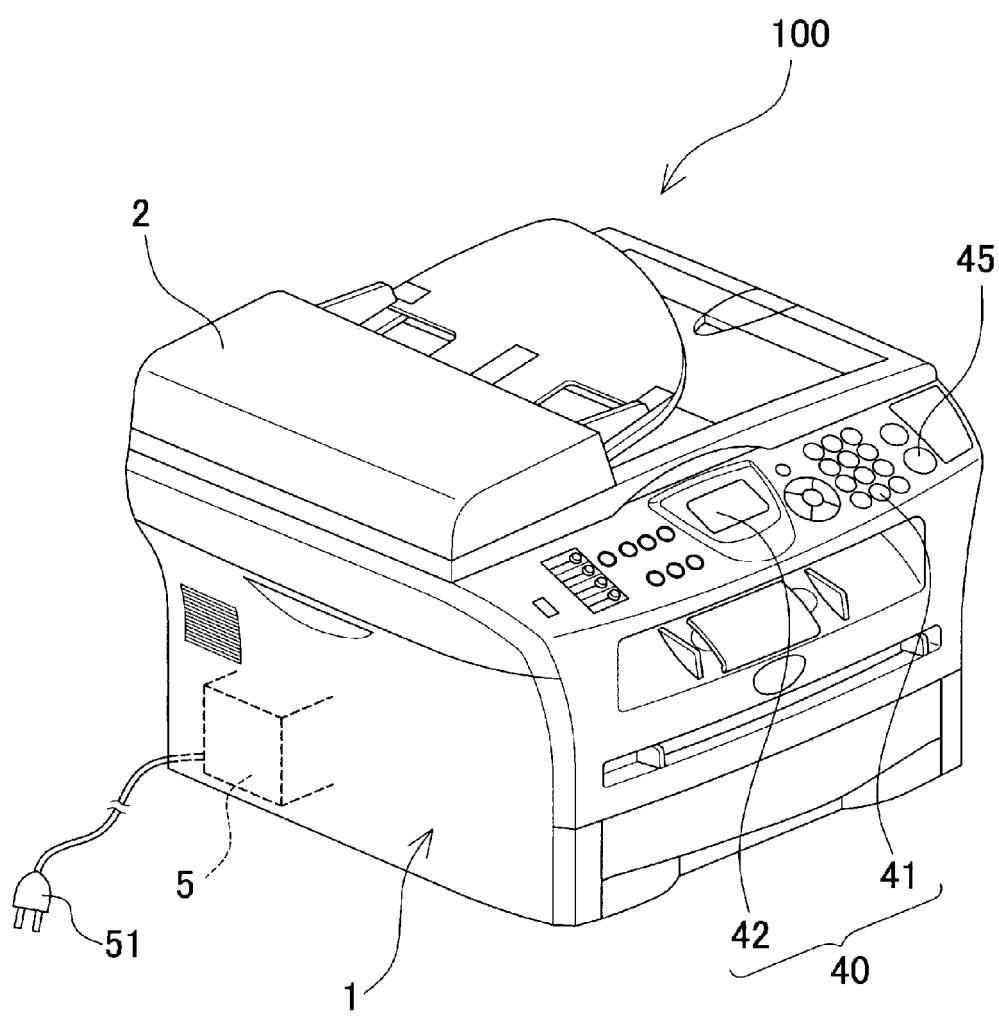
FIG. 1 is a perspective view showing an outer appearance of an MFP according to an illustrative embodiment of the present invention.

As shown in FIG. 1, an MFP 100 of this illustrative embodiment has an image forming unit 1 (an example of a printing unit and an input/output unit) which prints an image on a sheet and an image reading unit 2 (an example of a reading unit and an input/output unit) which reads an image of an original document. The image forming unit 1 is provided below the image reading unit 2. The image forming unit 1 of the MFP 100 can perform a color printing of an electrophotographic type. Alternatively, the image forming unit 1 may be a device which is dedicated to a black-and-white printing.

The image reading unit 2 is configured to read an original document and has an image sensor. The image sensor may be configured to read an original document which is conveyed by a conveyance device or an original document placed on a transparent glass while being moved by a carrier.

Also, the MFP 100 has, on its front surface, an operation panel 40 having a button group 41 consisting of various buttons (for example, a start key, a stop key and respective buttons of a numerical keypad) and a display unit 42 consisting of a liquid crystal display. With the button group 41 or display unit 42, an operating status can be displayed, and a user can input commands.

Also, a power supply switch 45 for receiving an operation of turning on or off a main power supply of the MFP 100 by a user is provided in the vicinity of the operation panel 40. It is noted that the power supply switch 45 is not a switch for mechanically cutting off a line but a type of a key which generates an electrical signal when a push operation of the user is received. The power supply switch 45 has a power supply system different from that of the operation panel 40 and power is supplied thereto, irrespective of whether a changeover switch 54 (which will be described later) becomes on or off.

The MFP 100 has a low-voltage power supply unit 5 (an example of a supply unit) which is a supply circuit for supplying power to the respective units including the image forming unit 1 and the image reading unit 2. The low-voltage power supply unit 5 is connected with a plug 51. When the plug 51 is inserted into a socket of commercial power, for example, the low-voltage power supply unit 5 is supplied with the power from a primary power source.

[Electrical Configuration of MFP]

Figure 2:
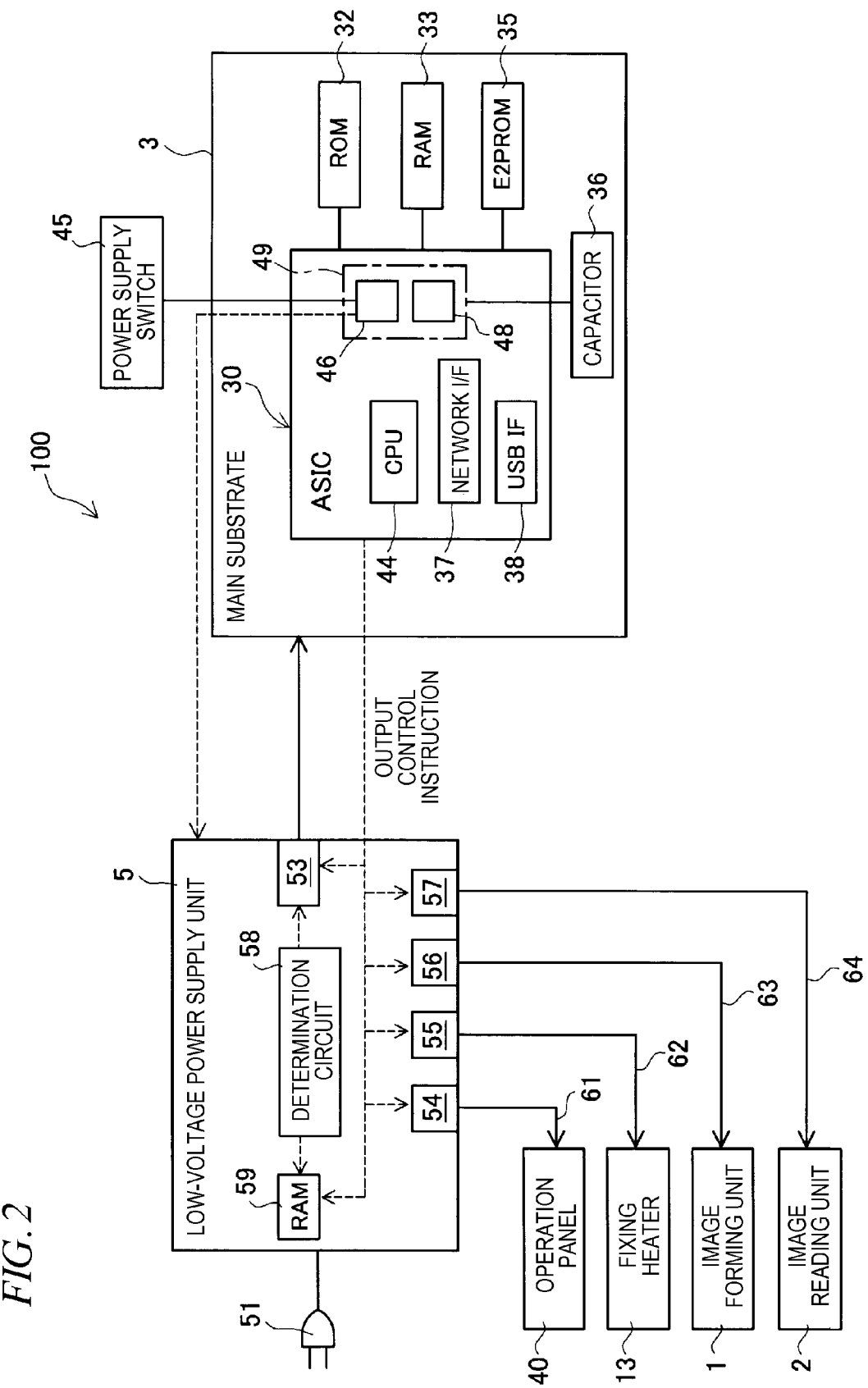
FIG. 2 is a block diagram showing an electrical configuration of the MFP.

Subsequently, an electrical configuration of the MFP 100 is described. As shown in FIG. 2, the MFP 100 has a main substrate 3 and the low-voltage power supply unit 5. The main substrate 3 is mounted thereon with a ROM 32, a RAM 33, an E2PROM 35 (an example of a storage unit), a capacitor 36 and an ASIC 30. The ASIC 30 is mounted with a CPU 44 (an example of a determination unit and a control unit), a network interface 37 and a USB interface 38.

The ROM 32 stores therein a variety of control programs for controlling the MFP 100, a variety of settings, initial values and the like. The RAM 33 is used as a work area to which the various control programs are loaded or a storage area in which a variety of data is temporarily stored. The E2PROM 35 is a non-volatile memory and is used as a storage area which stores therein the various settings and the like.

The capacitor 36 can temporarily accumulate therein charges and functions as an auxiliary power source different and separate from the power supply from the primary power source. An amount of power which can be supplied from the capacitor 36 is limited and the capacitor 36 discharges to some extent over time. Therefore, at a state where the power supply from the primary power source is interrupted, the power supply by the capacitor 36 is stopped as time elapses.

On the other hand, while the power supply from the primary power source continues, the charging to the capacitor 36 is appropriately performed.

The CPU 44 executes calculations for implementing a variety of functions such as an image reading function, an image forming function and the like in the MFP 100 and plays a central role in the image processing control. The CPU 44 stores a processing result in the RAM 33 and controls the respective constitutional elements of the MFP 100, based on a control program read out from the ROM 32. The CPU 44 performs image processing for image data read in the image reading unit 2 and enables the image forming unit 1 to print the same, based on an image processing program read from the ROM 32, for example.

The ASIC 30 controls the power supply to the respective configurations of the MFP 100. The CPU 44 performs processing of determining a power supply destination and processing of controlling the power supply to a destination determined to be supplied. For example, when the power supply from the primary power source is recovered from an interruption state, the CPU 44 executes power supply recovery processing including processing of determining a state of power supply of the MFP 100.

The network interface 37 is connected to a network. The MFP 100 is configured to perform data communication with the other information processing apparatus (not shown) (for example, a computer) through the network interface 37. The USB interface 38 is connected to a peripheral device (not shown) (for example, flash memory) which can be USB-connected. The MFP 100 is configured to perform data communication with an external peripheral device and the like through the USB interface 38.

The ASIC 30 further includes a power supply area 49 to which power from the capacitor 36 is supplied, as shown with a dashed-dotted line of FIG. 2. The power supply area 49 can be supplied with the power from the capacitor 36 for a certain length of time even when the power supply from the primary power source is interrupted. The power supply area 49 includes a backup region 48 (an example of a storage unit and a second storage unit) to and from which data can be simply input and output, a key sensor 46 which detects a user operation on the power supply switch 45, and the like.

The low-voltage power supply unit 5 is electrically connected to the plug 51 and is supplied with the power from the primary power source through the plug 51. The low-voltage power supply unit appropriately converts the power, which is supplied from the primary power source, into operation power necessary for operations of the respective units and then supplies the converted power to each of the main substrate 3, the operation panel 40, a fixing heater 13 (an example of an input/output unit and a printing unit), the image forming unit 1 and the image reading unit 2.

The low-voltage power supply unit 5 includes a plurality of changeover switches 53, 54, 55, 56, 57. The changeover switches 53 to 57 are switching-controlled by the CPU 44 of the ASIC 30. That is, the CPU 44 switches on or off states of the changeover switches 53 to 57 and thus controls the power supply to the respective constitutional elements of the MFP 100 by the low-voltage power supply unit 5. The low-voltage power supply unit 5 selectively supplies the operating power to a supply destination which is connected to the changeover switch turned on by the CPU 44.

The changeover switch 53 is a switch for turning on or off the power supply to the main substrate 3 from the low-voltage power supply unit 5. The changeover switch 54 is a switch for turning on or off the power supply to the operation panel 40 from the low-voltage power supply unit 5. The changeover switch 55 is a switch for turning on or off the power supply to the fixing heater 13 of the fixing device from the low-voltage power supply unit 5.

In the meantime, the fixing heater 13 is a part of the image forming unit 1 in terms of the function. However, the fixing heater 13 has high power consumption and is preferably independently turned on or off. Therefore, regarding the configuration of the power supply, the fixing heater 13 and the image forming unit 1 except for the fixing heater 13 are provided with separate paths.

The changeover switch 56 is a switch for turning on or off the power supply to the image forming unit 1 from the low-voltage power supply unit 5. The changeover switch 57 is a switch for turning on or off the power supply to the image reading unit 2 from the low-voltage power supply unit 5. The respective changeover switches 54, 55, 56, 57 and the respective members to which the power is supplied are connected through supply circuits 61, 62, 63, 64, respectively.

As shown in FIG. 2, the low-voltage power supply unit 5 has a determination circuit 58 and a RAM 59. The determination circuit 58 switches a state of the power supply from the low-voltage power supply unit 5 to the main substrate 3, based on whether a specific value is stored in the RAM 59. That is, the determination circuit 58 is a circuit turning off the changeover switch 53, on a condition that a specific value is stored in the RAM 59. When a specific value is not stored in the RAM 59, the determination circuit 58 turns on the changeover switch 53. The RAM 59 is volatile and is recorded with the specific value by the CPU 44.

In the meantime, as described above, the user operation on the power supply switch 45 is detected by the key sensor 46 which is provided to the power supply area 49. Therefore, even when the changeover switch 53 is off and the power supply to the main substrate 3 is thus interrupted, the key sensor 46 can still operate. Also, as shown with an arrow of a broken line in FIG. 2, when the key sensor 46 detects that the user pushes the power supply switch 45, the key sensor transmits an electrical signal to the low-voltage power supply unit 5. Therefore, even when the power supply to the main substrate 3 is interrupted, a signal is transmitted to the low-voltage power supply unit 5 if there is the user operation on the power supply switch 45.

[States of Power Supply]

Subsequently, a plurality of status of power supply of the MFP 100 and connection statuses of the respective changeover switches in the respective states are described with reference to FIGS. 3 and 4. As shown in FIGS. 3 and 4, the states of power supply of the MFP 100 include three states, that is, a power supply-on state 71, a power supply-off state 72 and a primary power supply interruption state 73.

FIG. 3 shows the states of power supply and operation modes of the MFP 100 and switching directions therebetween. FIG. 4 is a table for explaining power supply statuses and settings of the changeover switches in the respective states of power supply and operation modes. In FIG. 4, 'o' indicates that the power is being supplied or the changeover switch is on. In FIG. 4, 'x' indicates that the power is not supplied or the changeover switch is off.

The primary power supply interruption state 73 is a state where the power supply from the primary power source is interrupted because the plug 51 is unplugged or the commercial power is off, for example. Therefore, the power supply to the low-voltage power supply unit 5 or main substrate 3 is also interrupted. The primary power supply interruption state 73 is a state where an operation cannot be performed unless the power supply from the primary power source is resumed. However, when elapsed time after the power supply from the primary power source is interrupted is short and while the charges remain in the capacitor 36 (refer to FIG. 2), a limited operation is possible.

The power supply-off state 72 is a state where the power from the primary power source is being supplied but all functions except for the power supply switch 45 are stopped. At the power supply-off state 72, as shown in FIG. 4, the low-voltage power supply unit 5 is supplied with the power and all the changeover switches 53 to 57 are off. At the power supply-off state 72, the charges are supplemented to the capacitor 36 and the power is supplied from the capacitor 36 to the power supply area 49. Therefore, the power supply-off state 72 is a state where a circuit part provided to the power supply area 49 can operate. Since the key sensor 46 of the power supply switch 45 is provided to the power supply area 49, a push operation of the power supply switch 45 is received at the power supply-off state 72.

The power supply-on state 71 is a state where the power from the primary power source is being supplied and the low-voltage power supply unit 5 and the main substrate 3 are also being supplied with the power. As shown in FIG. 3, the power supply-on state 71 includes a normal state 75 and a power saving state 76. The normal state 75 is a state where the power is supplied to most of parts in the MFP 100 and an image processing operation can be immediately performed when a user instruction is received. In the meantime, the power saving state 76 is a state where the power supply to the member having high power consumption is interrupted to suppress the power consumption.

[Operation Modes at Power Supply-On State]

The MFP 100 has a variety of operation modes at the power supply-on state 71, as shown in FIGS. 3 and 4. The CPU 44 switches a supply destination to which the power is supplied, in each of the operation modes. Specifically, the CPU 44 switches the changeover switches 53 to 57 to thereby change an operation mode. The operation modes include a processing execution mode 81 and a standby mode 82 at the normal state 75, and a sleep mode 84 (an example of a power saving mode) and a deep sleep mode 85 (an example of a power saving mode) at the power saving state 76. Further, the other modes may be added.

The processing execution mode 81 is a mode in which the image processing is actually executed in response to an instruction from the user. In the processing execution mode 81, the power is supplied to all parts which are necessary to execute the processing. The standby mode 82 is a mode under an instruction standby state from the user. In the standby mode 82, for example, a temperature of the fixing heater 13 is set to be slightly lower, compared to a case where the processing is being executed. Also, for example, a conveyance member which conveys an original document or a print sheet is driven, as required, in the processing execution mode 81 but is not driven in the standby mode 82. At the normal state 75 including both the processing execution mode 81 and the standby mode 82, all the changeover switches 53 to 57 are on.

The sleep mode 84 is a mode for power saving in which the power is not supplied to a constitutional element having high power consumption of the MFP 100. For example, in the sleep mode 84, the CPU 44 stops the power supply to the fixing heater 13. In the sleep mode 84, the changeover switch 55 is off and the changeover switches 53, 54, 56, 57 are on.

The deep sleep mode 85 is a mode in which only an operation input to the operation panel 40 is received. In the deep sleep mode 85, the changeover switches 55, 56, 57 are off and the changeover switches 53, 54 are on. Therefore, in the deep sleep mode 85, the low-voltage power supply unit 5 supplies the power to a unit detecting the input to the operation panel 40 but does not supply the power to the image forming unit 1, the image reading unit 2 and the fixing heater 13. In the deep sleep mode, the low-voltage power supply unit 5 may also supply the power to the interfaces 37, 38 to thus receive the inputs to the interfaces 37, 38.

Both the sleep mode 84 and the deep sleep mode 85 are operation modes at the power saving state 76. Meanwhile, at the power saving state 76, an operation mode may be further provided in which the other constitutional elements (for example, an image sensor) having high power consumption, like the fixing heater 13, are selectively excluded from the power supply destinations, in addition to the sleep mode 84 and the deep sleep mode 85.

[Switching of State]

Subsequently, a switching between the respective states of power supply and a switching between the respective operation modes are described. When the state of power supply of the MFP 100 switches to another state, the CPU 44 records information, which indicates the state of power supply after the switching, to both the backup region 48 and the E2PROM 35 before the switching or after the switching. The information recorded by the CPU 44, which indicates the state of power supply, is information which distinguishes at least the power supply-on state 71 and the power supply-off state 72.

When the MFP switches from the power supply-on state 71 to the power supply-off state 72, the CPU 44 records the information, which indicates the state of power supply after the switching, before the switching. When the MFP switches from the power supply-off state 72 to the power supply-on state 71, the CPU 44 records the information, which indicates the state of power supply after the switching, after the switching. The CPU 44 is an example of a switching recording unit when it performs the processing of recording the information, which indicates the state of power supply after the switching, upon the switching of the state of power supply of the MFP 100 to another state.

At the power supply-off state 72, as shown in FIG. 4, the main substrate 3 is not supplied with the power. When the power supply switch 45 is pushed at the power supply-off state 72, the key sensor 46 of the power supply area 49 detects that the power supply switch 45 is pushed and transmits a signal, which indicates that the power supply switch 45 is pushed, to the low-voltage power supply unit 5. By the signal indicating that the power supply switch 45 is pushed, the changeover switch 53 of the low-voltage power supply unit 5 is switched to the on-state and the power supply from the low-voltage power supply unit 5 to the main substrate 3 starts. Thereby, the CPU 44 of the ASIC 30 is supplied with the power.

After the power is supplied to the CPU 44, the CPU 44 executes power supply-on processing. The power supply-on processing is starting processing of the MFP 100 including checking the initial settings of the image forming unit 1 and the image reading unit 2 and the remaining amounts of disposables, and the like. When the power supply-on processing is over, the MFP 100 is at the standby state unless an execution instruction is received from a user.

Thereby, the MFP 100 switches from the power supply-off state 72 to the normal state 75 of the power supply-on state 71, as shown with an arrow 91 of FIG. 3. Also, at the power supply-on state 71, the CPU 44 records information indicating the power supply-on state 71, for example, information indicating the standby mode 82 to both the backup region 48 and the E2PROM 35.

The switching from the power supply-on state 71 to the power supply-off state 72 is executed by the CPU 44 when the power supply switch 45 is pushed at the power supply-on state 71 (refer to an arrow 92 of FIG. 3). When the power supply switch 45 is pushed at the power supply-on state 71, the CPU 44 saves the variety of setting information and interrupts the power supply to the respective units in appropriate order. Also, after the CPU 44 stores the information indicating the power supply-off state 72 in both the backup region 48 and the E2PROM 35, the CPU interrupts the power supply to the CPU 44. That is, the CPU 44 turns off the changeover switch 53 so as to interrupt the power supply to the main substrate 3 including the ASIC 30, on which the CPU 44 is mounted, at the end of the switching processing to the power supply-off state 72.

[Switching of Operation Mode at Power Supply-On State]

At the power supply-on state 71, the MFP 100 switches an operation mode between the above-described operation modes, on a condition of the user operation on the operation panel 40, the data reception from the outside or the elapse of time. When a predetermined condition is satisfied, the operation mode of the MFP 100 switches, as shown with the respective arrows 93 to 97 in FIG. 3. Also, when the operation mode switches, the CPU 44 switches the on and off states of the respective changeover switches 53 to 56 of the low-voltage power supply unit 5 so that the power is supplied to a necessary supply destination in the operation mode after the switching.

For example, in the standby mode 82, when a state where a user instruction is not input continues for predetermined first standby time or longer, the MFP 100 enters the power saving state 76, as shown with the arrow 93 of FIG. 3. Also, in the sleep mode 84 of the power saving state 76, when a state where a user instruction is not input continues for predetermined second standby time or longer, the MFP 100 switches to the deep sleep mode 85, as shown with the arrow 94 of FIG. 3.

Also, at the power saving state 76 of the sleep mode 84 or deep sleep mode 85, when a user input to the button group 41 and the like is received, for example, the MFP 100 switches to the normal state 75 of the processing execution mode 81 or standby mode 82, as shown with the arrow 95 of FIG. 3. Also, when an instruction such as image processing is received by a user operation at the standby mode 82, the MFP 100 switches from the standby mode 82 to the processing execution mode 81, as shown with the arrow 96 of FIG. 3. Then, the MFP 100 executes the image processing, based on the user instruction. When the instructed image processing is over, the MFP 100 switches from the processing execution mode to the standby mode 82, as shown with the arrow 97 of FIG. 3.

Also, when the operation mode switches at the power supply-on state 71, the CPU 44 records the information, which indicates the operation mode after the switching, to both the backup region 48 and the E2PROM 35 together with the information indicating the power supply-on state 71, before the switching or after the switching. The CPU 44 is an example of a switching recording unit when it performs the processing of recording the information, which indicates the operation mode after the switching, upon the switching of the operation mode of the MFP 100.

[Interruption of Primary Power Source]

Even at the power supply-on state 71 and even at the power supply-off state 72, the MFP 100 switches to the primary power supply interruption state 73 (refer to the arrows 98, 99 of FIG. 3) when the plug 51 is unplugged from the socket of commercial power or when the commercial power is off. At the state where the power supply from the primary power source is interrupted, any part in the MFP 100 is not supplied with the power (refer to FIG. 4). That is, when the primary power source is interrupted, the commercial power is not supplied to the low-voltage power supply unit 5, so that the MFP 100 does not receive even the operation of the power supply switch 45.

As described above, since the capacitor 36 (refer to FIG. 2) can accumulate the charges, even when the power supply from the primary power source is interrupted, the capacitor 36 can function as an auxiliary power source in a limited way. Therefore, while the charges are in the capacitor 36, the information stored in the backup region 48 is maintained.

However, at the state where the primary power source is interrupted, the charge supplementation to the capacitor 36 is not performed. Therefore, when predetermined time elapses after the primary power source is interrupted, the capacitor 36 cannot supply the power to the power supply area 49, so that it loses the function as the auxiliary power source. After the capacitor 36 loses the function as the auxiliary power source, the information stored in the backup region 48 is lost. In the meantime, since the E2PROM 35 is non-volatile, the information stored therein is kept even when the primary power source is interrupted for a long time.

[Recovery of Primary Power Source]

For example, it is assumed that a user moves the MFP 100 from a Y point to a Z point. In this case, since the user unplugs the plug 51 from the socket of commercial power so as to move the MFP 100, the MFP 100 enters a state where the power supply from the primary power source is interrupted. Then, the user moves the MFP 100 from the Y point to the Z point and inserts the plug 51 into the socket of commercial power at the Z point, so that the MFP 100 is recovered from the state where the power supply from the primary power source is interrupted to a state where the power is supplied from the primary power source.

However, when an MFP of the related art is recovered from the state where the power supply from the primary power source is interrupted to the state where the power is supplied from the primary power source, it is controlled to switch to the normal state. Therefore, if the MFP of the related art is located at the Z point, the MFP of the related art is returned to the normal state, even when the MFP is at the power supply-off state at the Y point at which the MFP was located. A user who wants the MFP of the related art to be kept at the power supply-off state even after the MFP is moved from the Y point to the Z point should push the power supply switch 45 so as to switch the MFP from the normal state to the power supply-off state, which is a burden to the user.

Also, at the state where the power supply from the primary power source to the MFP of the related art is interrupted due to the power failure, when it is returned from the power failure state, the MFP switches to the normal state even though it is at the power supply-off state before the power failure. Therefore, a burden is applied to a user who wants the MFP to keep the power supply-off state.

Compared to the above, when the MFP 100 of this illustrative embodiment is recovered from the state where the power supply from the primary power source is interrupted to the state where the power is supplied from the primary power source, it performs processing so that the same state as that before the power supply from the primary power source is interrupted can be kept. In the below, the processing of the MFP 100 is specifically described.

When the power supply from the primary power source is recovered from the interruption state, the commercial power is first supplied to the low-voltage power supply unit 5. Since the RAM 59 (refer to FIG. 2) of the low-voltage power supply unit 5 is volatile, the content stored in the RAM 59 is lost as the power supply from the primary power source is interrupted. That is, since a specific value is not stored in the RAM 59, the determination circuit 58 turns on the changeover switch 53. Therefore, the low-voltage power supply unit 5 supplies the power to the main substrate 3. Thereby, the CPU 44 can operate.

When the power supply from the primary power source is recovered from the primary power supply interruption state 73, the CPU 44 executes power supply recovering processing that will be described later. The CPU 44 executes the power supply recovering processing to determine a state of power supply after the recovery and to switch the MFP 100 to the determined state of power supply. The CPU 44 selects any one of at least the power supply-on state 71 and the power supply-off state 72, as the state of power supply after the recovery. That is, when the power supply from the primary power source is recovered, the CPU 44 determines whether to proceed to the arrow A or arrow B shown with the broken line in FIG. 3.

[Power Supply Recovery Processing]

Subsequently, the power supply recovering processing which is executed by the CPU 44 is described with reference to a flowchart of FIG. 5. The processing is executed when the power supply from the primary power source is recovered from the state where the power supply from the primary power source is interrupted.

When the power supply recovering processing starts, the CPU 44 reads out information, which indicates a state of power supply before the power supply from the primary power source is interrupted, from the backup region 48 (S101). Then, the CPU 44 determines whether the information read out in S101 is an indefinite value (S103).

As described above, when switching the state of power supply and the operation mode, the CPU 44 records the information of the state of power supply and operation mode after the switching to both the backup region 48 and the E2PROM 35. Therefore, if the power supply by the capacitor 36 is not stopped, the information of the state of power supply and operation mode before the power supply from the primary power source is interrupted remains in the backup region 48. However, if the charges of the capacitor 36 are all consumed and the power supply is thus stopped, the content stored in the backup region 48 becomes an indefinite value. For example, when the elapsed time after the power supply from the primary power source is interrupted is long, there is a high possibility that the content stored in the backup region 48 will be an indefinite value.

Therefore, when the information read out in S101 is not an indefinite value (S103: No), the CPU 44 determines whether the state of power supply before the power supply from the primary power source is interrupted is the power supply-off state 72, based on the read information (S107: an example of a determination unit). That is, when the state of power supply and operation mode before the power supply from the primary power source is interrupted can be appropriately read out, the CPU 44 uses the read information in the determination of S107. Then, the CPU 44 determines whether the state of power supply before the interruption of the primary power source is the power supply-on state 71 or the power supply-off state 72.

On the other hand, when the information read out in S101 is an indefinite value (S103: Yes), the CPU 44 reads out the information, which indicates the state of power supply before the power supply from the primary power source is interrupted, from the E2PROM 35 (S105). Since the E2PROM 35 is a non-volatile memory, the CPU 44 can reliably read out the information. Subsequently, the CPU 44 records the information read out in S105 to the backup region 48 (S106).

After S106, the CPU 44 returns to S101 and reads out the information from the backup region 48. Since the information is recorded in S106, the information which is read out in S101 is not an indefinite value (S103: No). Therefore, the CPU 44 proceeds to S107 and determines the state of power supply before the interruption of the primary power source, based on the information read out in S101 (S107). In the meantime, the CPU 44 may use the information read out from the E2PROM 35, as it is, to thus perform the determination in S107, without the recording to the backup region 48.

Meanwhile, in order to read out the information from the E2PROM 35, the CPU 44 should perform an initial operation such as size determination of a memory, and the like. Therefore, it takes more time to read out the information from the E2PROM 35 than the readout from the backup region 48. Thus, when the information remains in the backup region 48, the CPU 44 preferentially uses the information remaining in the backup region 48 to thus shorten the processing time.

That is, the CPU 44 records the information indicating the state of power supply to both the E2PROM 35 and the backup region 48 and preferentially uses the information remaining in the backup region 48. That is, the E2PROM 35 is an example of a storage unit, and the backup region 48 is an example of a second storage unit.

When the CPU 44 determines in S107 that the state of power supply before the power supply from the primary power source is interrupted is the power supply-off state 72 (S107: Yes), the CPU 44 records a specific value to the RAM 59 of the low-voltage power supply unit 5 and turns off the changeover switch 53 (an example of a control unit). Thereby, the power supply to the main substrate 3 is interrupted and the MFP 100 enters the power supply-off state 72 (S109). In the meantime, the CPU 44 also turns off the changeover switches 54 to 57. The MFP 100 enters the power supply-off state 72, so that the power supply recovering processing is over.

On the other hand, when the CPU 44 determines in S107 that the read information is not the information indicating the power supply-off state 72 (S107: No), the CPU 44 switches the state of power supply of the MFP 100 to the power supply-on state 71 (S111). That is, when a result of the determination in S107 is No, the CPU 44 keeps the changeover switch 54 at the on-state without recording a specific value to the RAM 59 of the low-voltage power supply unit 5. Therefore, the power is continuously supplied to the main substrate 3.

When switching to the power supply-on state 71, the CPU 44 executes operation mode switching processing of switching to the operation mode of the MFP 100 before the power supply from the primary power source is interrupted, based on the determination result in S107 (S112). When the switching processing is over, the power supply recovering processing is over. With the above, the descriptions of the power supply recovering processing end.

Subsequently, the operation mode switching processing is described with reference to FIGS. 6 and 7. When the CPU 44 proceeds to S112 of FIG. 5, the CPU 44 performs the switching control of the changeover switches 54 to 57 so that it enters the operation mode recorded in the backup region 48. In the meantime, the information which is read out in S101 by the CPU 44 also includes the content relating to the operation mode.

Figure 5:
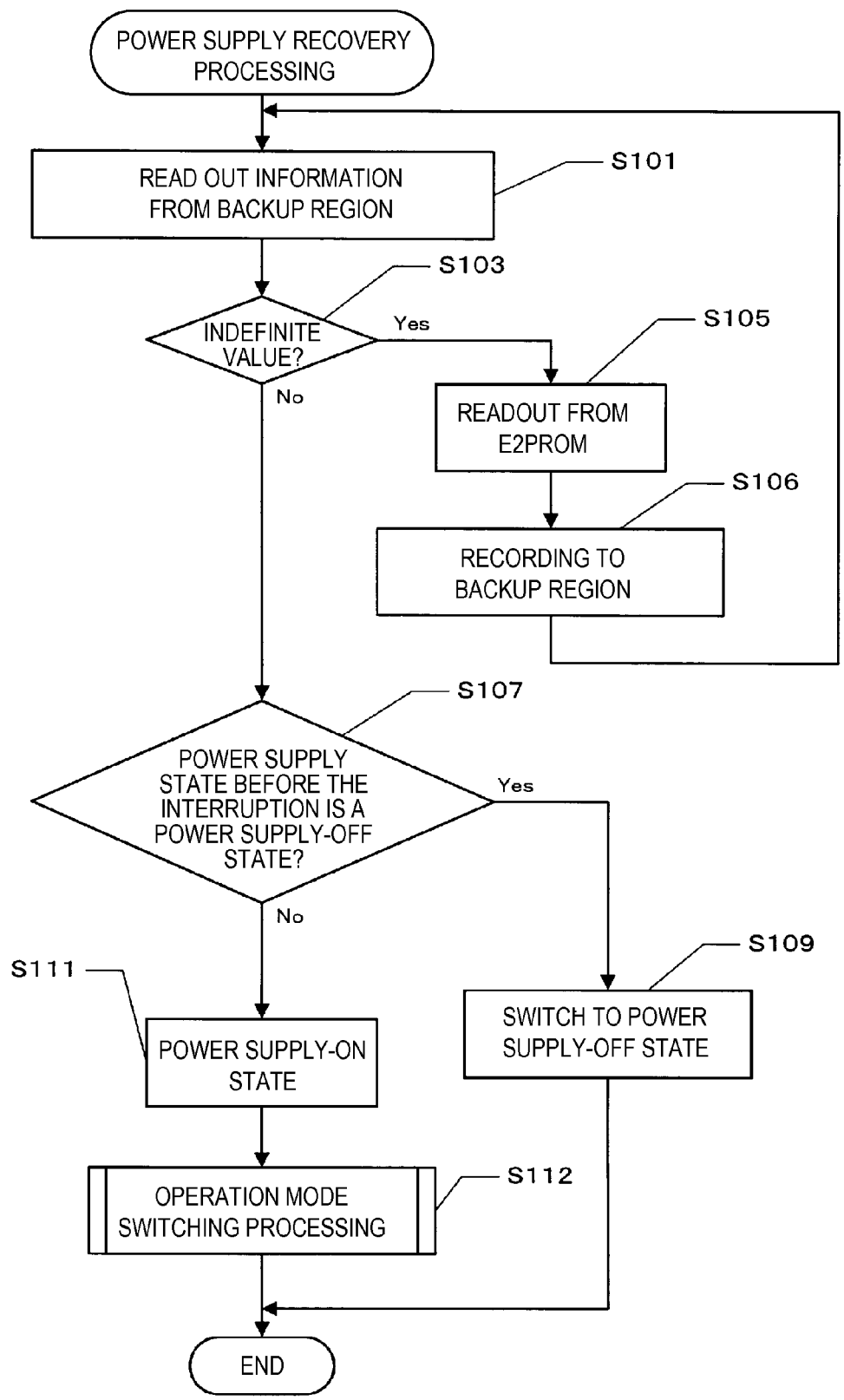
FIG. 5 is a flowchart showing power supply recovery processing.
Figure 6:
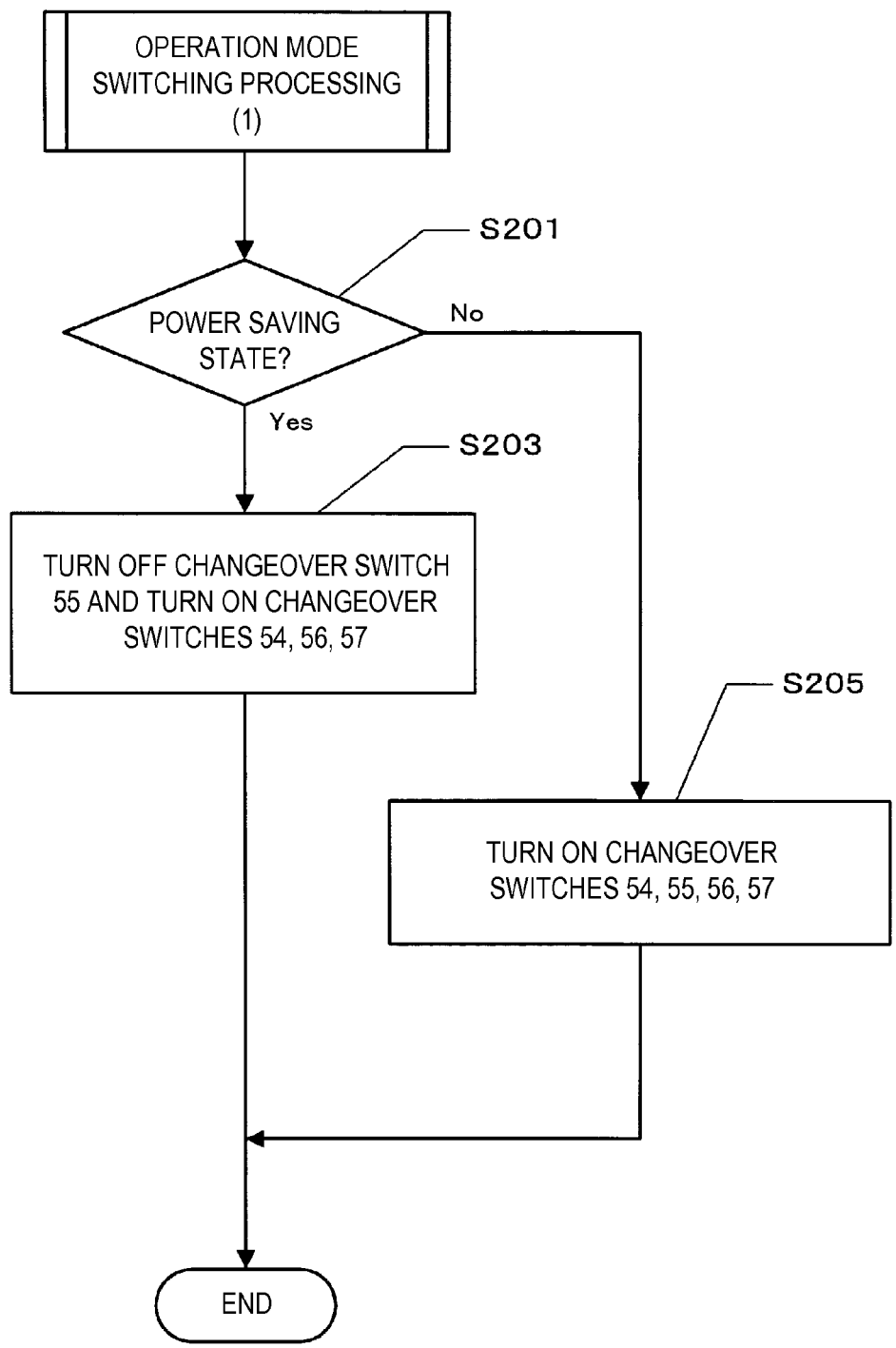
FIG. 6 is a flowchart showing operation mode switching processing.

When the operation mode switching processing starts, the CPU 44 first executes operation mode switching processing (1) of FIG. 6. Then, the CPU 44 determines whether the operation mode of the MFP 100 before the power supply from the primary power source is interrupted, which is read in S101 of FIG. 5, is the power saving state 76 (S201).

When it is determined in S201 that the operation mode is the power saving state 76 (S201: Yes), the CPU 44 keeps the changeover switch 55 at the off-state so that the power is not supplied to the fixing heater 13. Also, the CPU 44 switches the changeover switches 54, 56, 57 to the on-state. Thereby, the MFP 100 enters the power saving state 76 in which the power consumption is suppressed. Therefore, after the power supply-on processing, the MFP does not always enter the standby mode and the power consumption can be reduced. In this case, with this, the operation mode switching processing is over.

When it is determined in S201 that the operation mode is not the power saving state 76 (S201: No), the CPU 44 switches the changeover switches 54, 55, 56, 57 to the on-state. That is, the CPU switches all the changeover switches to the on-state. Thereby, the MFP 100 enters the normal state 75, not the power saving state 76. In this case, with this, the operation mode switching processing is over.

In the meantime, regarding the operation modes at the normal state, when there are further modes, depending on whether the power is supplied to the image forming unit 1 and the image reading unit 2, more detailed mode switching processing can be executed. Herein, "there are further modes" include a case where it is possible to determine whether the power is supplied to the image forming unit 1 of the MFP 100 before the interruption of the primary power source and whether the power is supplied to the image reading unit 2 of the MFP 100 before the interruption of the primary power source, respectively, from the information recorded in the backup region 48. In this case, the CPU 44 further executes operation mode switching processing (2) shown in FIG. 7, following S205.

Figure 7:
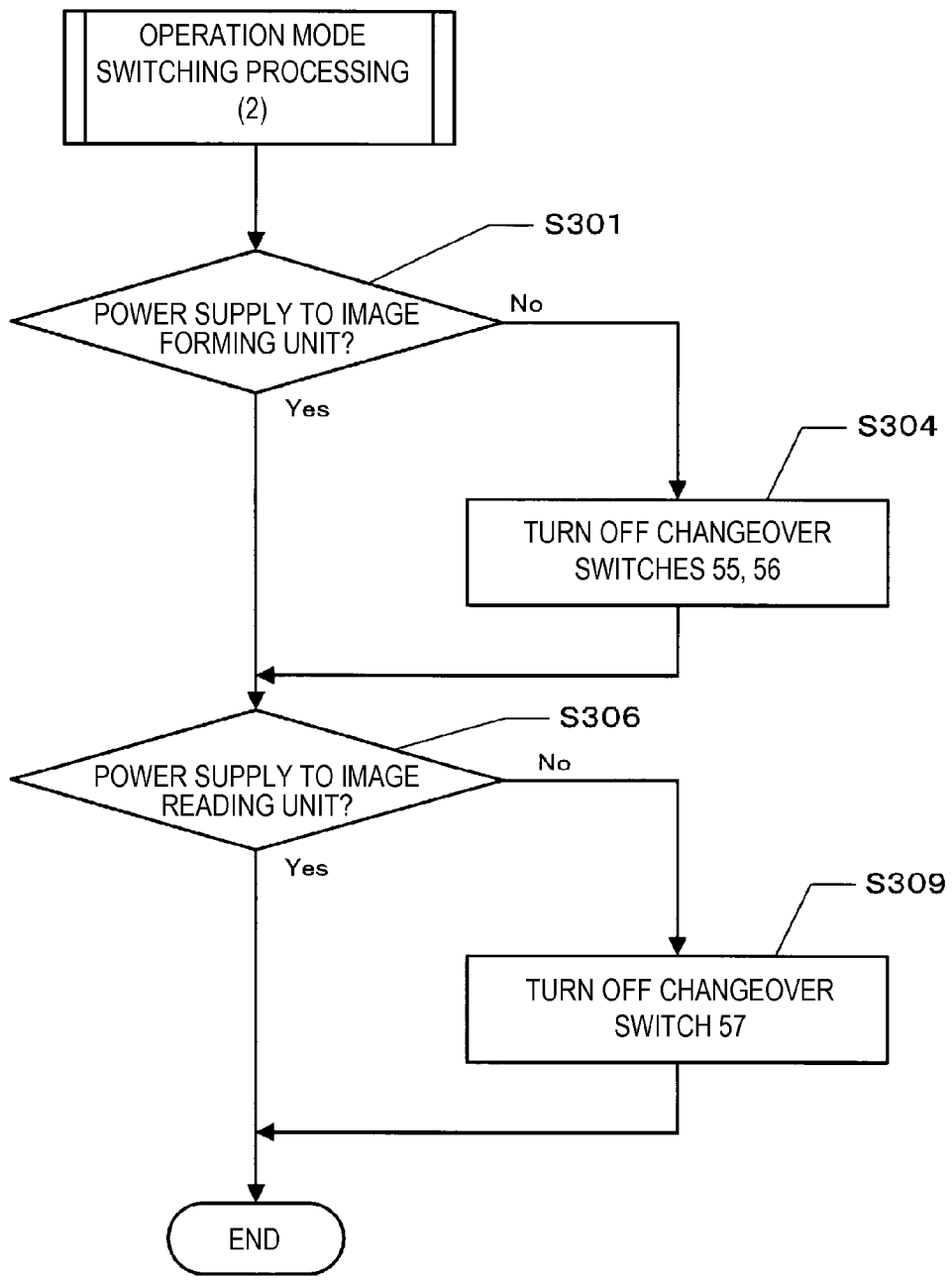
FIG. 7 is a flowchart which is continued from the operation mode switching processing.

When the operation mode switching processing shown in FIG. 7 starts, the CPU 44 first determines whether the operation mode of the MFP 100 before the interruption of the primary power source, which is read out in S101 of FIG. 5, is a mode of supplying the power to the image forming unit 1 (S301). When it is determined that the operation mode is a mode of supplying the power to the image forming unit 1 (S301: Yes), the CPU 44 proceeds to S306 without executing any processing. In this case, all the changeover switches 53 to 57 are on.

Also, when it is determined that operation mode is not a mode of supplying the power to the image forming unit 1 (S301: No), the CPU 44 turns off the changeover switches 55, 56 (S304). That is, the CPU 44 interrupts the power supply to the member for performing the image forming processing. In this case, the changeover switches 53, 54, 57 become on and the changeover switches 55, 56 become off.

Then, the CPU 44 determines whether the operation mode of the MFP 100 before the interruption of the primary power source is a mode of supplying the power to the image reading unit 2 (S306). When it is determined that the operation mode is a mode of supplying the power to the image reading unit 2 (S306: Yes), the CPU 44 ends the operation mode switching processing (2) without executing any processing. In this case, the respective changeover switches 53 to 57 are kept at the states set before S306.

Also, when it is determined that operation mode is not a mode of supplying the power to the image reading unit 2 (S306: No), the CPU 44 turns off the changeover switch 57 (S309). In this case, since a result of the determination in S301 was Yes, the changeover switches 53, 54, 55, 56 become on and the changeover switch 57 becomes off. Then, the CPU 44 ends the operation mode switching processing (2). With the above, the descriptions of the power supply recovering processing end.

As specifically described above, the MFP 100 of this illustrative embodiment has the plurality of states of power supply while the power is supplied from the primary power source. When the state of power supply is switched, the state of power supply after the switching is stored in the backup region 48 and the E2PROM 35. Also, at the power supply-on state 71, when the operation mode is switched, the CPU 44 stores the operation mode after the switching in the backup region 48 and the E2PROM 35. Therefore, the latest information of the state of power supply and the operation mode is stored in the backup region 48 and the E2PROM 35 all the time while the power is kept being supplied from the primary power source.

When the power supply from the primary power source is recovered after the interruption state, the CPU 44 reads out the information of the state of power supply and operation mode stored in at least one of the backup region 48 and the E2PROM 35. Also, the CPU 44 determines the power supply destination, based on the read information. Therefore, it is possible to reproduce the state of power supply before the power supply from the primary power source is interrupted.

While the present invention has been shown and described with reference to certain illustrative embodiments thereof, it will be understood by those skilled in the art that various changes in form and details may be made therein without departing from the spirit and scope of the invention as defined by the appended claims.

For example, the present invention is not limited to the MFP, and the inventive concept of the present invention can be applied to an apparatus having an image processing function, such as copier, FAX and the like. Also, the inventive concept of the present invention can be applied to an apparatus having an image forming unit of an inkjet type.

Also, for example, in the above illustrative embodiment, when the state of power supply or operation mode is switched, the information indicating the state after the switching is stored in both the backup region 48 and the E2PROM 35. However, the present invention is not limited thereto. For example, the backup region 48 may not be provided. When the backup region 48 is not provided, the CPU 44 records the information of the state of power supply and operation mode in the E2PROM 35 and reads out the same from the E2PROM 35.

Also, for example, the recording to the E2PROM 35 may not be performed. In this case, at least while the information remains in the backup region 48, the state of power supply upon the interruption is determined, based on the corresponding information. Even with this configuration, for the power failure of short time, the MFP 100 can return to the original state.

Also, for example, the CPU 44 may periodically perform the recording, instead of recording the information of the state of power supply and operation mode upon the mode switching. In this case, the CPU 44 records the information of the mode at that time to both the backup region 48 and the E2PROM 35 or to the E2PROM 35 only. When periodically performing the recording, the CPU 44 is an example of a periodic recording unit.

Also, for example, in the above illustrative embodiment, the information of the state of power supply and operation mode is stored in both the backup region 48 and the E2PROM 35. However, the CPU may record the information to the E2PROM 35 only, while the power is kept being supplied from the primary power source. In this case, the CPU 44 is an example of a primary recording unit.

When the information is recorded in the E2PROM 35 only, a detection circuit which detects the interruption of the power supply from the primary power source and a copy circuit which copies the information stored in the E2PROM 35 to the backup region 48 are preferably further provided. The copy circuit may perform the copy by using the power of the capacitor 36. When the detection circuit detects that the power supply from the primary power source is interrupted, the copy circuit immediately copies the information stored in the E2PROM 35 into the backup region 48. By doing so, the processing is simpler, compared to a configuration where the information is recorded to both every time. In this case, the detection circuit is an example of a detection unit, and the copy circuit is an example of a secondary recording unit.

Also, in the above illustrative embodiment, when the operation mode is switched during the power supply-on state 71, the CPU 44 stores the information indicating the operation mode after the switching. However, the CPU 44 needs only to store at least the state of power supply (power supply-on state 71 or power supply-off state). That is, when the state of power supply is switched, the CPU 44 may need only to store the state of power supply after the switching. In this case, at the power supply-on state 71, the CPU 44 may be configured to return to the standby mode.

Also, for example, the number or assignation of the respective changeover switches 53 to 57 is not limited to the above configuration. In the above illustrative embodiment, the changeover switch 56 for switching the power supply to the image forming unit 1 and the changeover switch 57 for switching the power supply to the image reading unit 2 are separately provided. However, one changeover switch for switching the power supply may be provided. Alternatively, more switches may be provided to perform the control in more detail.

Also, for example, a state where the pushing operation on the operation panel 40 as well as the power supply switch 45 during the power supply-off state 72 is received may be further provided.

Also, the processing described in the above illustrative embodiments may be executed by hardware such as single CPU, a plurality of CPUs, an ASIC and the like or a combination thereof. Also, the processing described in the above illustrative embodiment can be implemented by a non-transitory recording medium in which a program for executing the processing is recorded, a method and the like.

What is claimed is:

1. An image processing apparatus comprising:
an input/output unit configured to perform at least one of an input operation and an output operation which are related to image processing;
a supply unit configured to supply power from a primary power source to the input/output unit through a supply circuit;
a storage unit configured to store therein a state of power supply to the input/output unit before the power supply from the primary power source is interrupted; and
a controller configured to:
when the power supply is started from a state where the power supply from the primary power source is interrupted, determine whether to supply power to the input/output unit through the supply circuit, based on the state of power supply stored in the storage unit;
when it is determined to supply power to the input/output unit, control the supply unit to supply power to the input/output unit; and
when it is determined not to supply power to the input/output unit, control the supply unit not to supply power to the input/output unit.

2. The image processing apparatus according to claim 1,
wherein the input/output unit includes a plurality of input/output units,
wherein the storage unit stores, as the state of power supply, one of a plurality of modes including a first mode in which all of the input/output units are supplied with power from the supply unit, a second mode in which none of the input/output units are supplied with power from the supply unit, and a third mode in which at least one of the input/output units is supplied with power from the supply unit and the other of the input/output units is not supplied with power from the supply unit.

3. The image processing apparatus according to claim 1,
wherein the input/output unit includes a plurality of input/output units, and
wherein the storage unit stores, as the state of power supply, one of a plurality of modes including a standby mode in which power is supplied to all the input/output units and the image processing apparatus stands by for execution of the image processing, and a power saving mode in which power is not supplied to at least one of the input/output units and execution of the image processing is limited.

4. The image processing apparatus according to claim 1,
wherein the input/output unit includes:
    a printing unit configured to print an image; and
    a reading unit configured to read an image,
wherein the supply unit is configured to supply power to the printing unit and the reading unit,
wherein the storage unit is configured to further store, as the state of power supply, one of a plurality of modes including a first mode in which both the printing unit and the reading unit are supplied with power from the supply unit, and a second mode in which both the printing unit and the reading unit are not supplied with power from the supply unit, and a third mode in which either one of the printing unit and the reading unit is supplied with power from the supply unit and the other is not supplied with power from the supply unit, and
wherein the controller is configured to determine whether to supply power to the printing unit and the reading unit, in accordance with the one of the plurality of modes stored in the storage unit.

5. The image processing apparatus according to claim 1, further comprising:
an auxiliary power source which is a separate power source from the primary power source,
wherein the storage unit has a backup region to which power is supplied from the auxiliary power source.

6. The image processing apparatus according to claim 1, wherein the storage unit is a non-volatile memory.

7. The image processing apparatus according to claim 6, further comprising:
    an auxiliary power source which is a separate power source from the primary power source; and
    a second storage unit which has a backup region, to which power is supplied from the auxiliary power source, and configured to store therein the state of power supply to the input/output unit before the power supply from the primary power source is interrupted,
wherein the controller is configured to perform the determination in accordance with the state of power supply when the state of power supply is stored in the backup region, and perform the determination in accordance with the state of power supply stored in the non-volatile memory when the state of power supply is not stored in the backup region.

8. The image processing apparatus according to claim 7,
wherein the controller is further configured to, while the power supply from the primary power source is not interrupted, record the state of power supply to the non-volatile memory periodically or each time when the state of power supply is switched,
wherein the image processing apparatus further comprises:
    a detection unit configured to detect that the power supply from the primary power source is interrupted, and
    a recording unit configured, after the detection unit detects that the power supply is interrupted, to be supplied with power from the auxiliary power source to record the state of power supply stored in the non-volatile memory into the backup region.

9. The image processing apparatus according to claim 1, wherein the controller is further configured to, while the power supply from the primary power source is not interrupted, record the state of power supply after the state of power supply is switched, to the storage unit each time when the state of power supply is switched.

10. The image processing apparatus according to claim 1, wherein the controller is further configured to, while the power supply from the primary power source is not interrupted, periodically record the state of power supply to the storage unit.

* * * * *